United States Patent [19]

Hall et al.

[11] Patent Number: 4,669,300

[45] Date of Patent: Jun. 2, 1987

[54] ELECTROMAGNETIC STYLUS FORCE ADJUSTMENT MECHANISM

[75] Inventors: Paul H. Hall; Steven A. Riley, both of Santa Barbara; Robert G. Rizos, Buellton, all of Calif.

[73] Assignee: Sloan Technology Corporation, Santa Barbara, Calif.

[21] Appl. No.: 596,036

[22] Filed: Mar. 30, 1984

[51] Int. Cl.⁴ .......................... G01B 7/34; G01B 7/28
[52] U.S. Cl. ........................................ 73/105; 33/551
[58] Field of Search ............... 73/105; 33/174 E, 503, 33/551, 555

[56] References Cited

U.S. PATENT DOCUMENTS

| | | |
|---|---|---|
| 2,079,515 | 5/1937 | Ligh . |
| 2,361,788 | 10/1944 | Neff ........................................ 73/105 |
| 2,691,887 | 10/1954 | Rinker .................................. 73/105 |
| 2,917,590 | 12/1959 | Stanton . |
| 3,830,505 | 8/1974 | Rabinow . |
| 4,023,130 | 5/1977 | Ridler ................................. 369/230 |
| 4,138,121 | 2/1979 | Nakajima . |
| 4,258,233 | 3/1981 | Simshauser . |
| 4,323,998 | 4/1982 | Fukazawa . |
| 4,340,956 | 7/1982 | Miller . |

Primary Examiner—Stewart J. Levy
Assistant Examiner—Tom Noland
Attorney, Agent, or Firm—Koppel & Harris

[57] ABSTRACT

Adjustment of the force that a stylus exerts on an object in a stylus profiler is accomplished by having a magnetic core, which is operably connected to the stylus and and mounted within an electromagnetic coil. The core moves relative to the coil as the stylus moves vertically. The coil creates a uniform magnetic field within the range of movement of the core. The core is elongated to be subject to uniform fields so that the force that the core-coil combination applies to the stylus is constant irrespective of the vertical position of the stylus.

8 Claims, 3 Drawing Figures

ELECTROMAGNETIC STYLUS FORCE ADJUSTMENT MECHANISM

BACKGROUND OF THE INVENTION

1. Field of Invention:

The present invention relates to a mechanism for adjusting the force on a stylus in a profiler.

2. Description of the Prior Art:

Stylus profilers and other step height measurement instruments are devices for measuring the profile or contour of a surface. They are used in the testing of the surface of semiconductor devices and in metal working, chemical, printing, information storage and other industries. The common technique for manufacturing semiconductors, for example, includes depositing certain materials on a substrate or wafer. A profiler measures the pattern and dimension of the deposits which are crucial for the desired operation of the semiconductors. In other applications the stylus may be used to characterize the primary surface itself.

Both a profiler and other step height measurement instruments each rely on a narrow-diameter stylus moving along a surface either by movement of the stylus or movement of the surface of interest. Stylus movement should be linear to result in a true profile. In this specification, the term "profiler" generally means a device in which the stylus and the surface of interest move linearly with respect to each other. There are instruments, called "step height measurement instruments" here, in which the stylus moves in an arc. As the stylus encounters surface features, the stylus moves vertically to accommodate the deposits, irregularities or finish. Typically, the stylus is mounted on an arm, and the arm is coupled to a linear variable differential transformer (LVDT). LVDT's are electromechanical transducers that produce electrical outputs proportional to the displacement of a core movable in a primary and secondary coil of a transformer. The core is coupled to the stylus arm, and vertical movement of the stylus moves the stylus arm, which in turn moves the coil in the transformer to modify the output voltage. This output voltage is read, and the height and location of features on the surface is determined at locations which are read by devices associated with the carriage.

Accurate measurement of very small features becomes more crucial as, for example, more circuit elements are deposited on semiconductors. It becomes more desirable, therefore, to use a narrower diameter stylus; wider diameter styli introduce too much error. As the stylus diameter decreases, if the downward force is held constant, the force per unit area (pressure) increases as a function of the square of the decrease in diameter. Unless the force transmitted to the surface from the stylus is carefully controlled, the stylus could damage the surface or surface feature, and the stylus itself can be overloaded.

In the past, stylus force was controlled by means of a spring-balance or counter-balance arrangement. That is, the weight of the arm-stylus combination is balanced by an upward spring force and/or a mass counter-balance. Spring force varies with position and, therefore, may yield errors. Because of the manner in which the arm is attached for pivoting on the profiler body, a spring may not act linearly. There is further concern that the spring constant will change even though profilers operate in controlled environment.

In other fields such as phonograph record arms, magnets have been used for balancing and controlling the stylus pressure. Examples include Nakajima, U.S. Pat. No. 4,138,121 (1979) and Rabinow, U.S. Pat. No. 3,830,505 (1974). These devices balance a stylus in the 0.5-2.0 gram range. Stylus profilers, however, operate with much more critical force adjustments, in the milligram range, and the force must remain constant as the stylus moves vertically.

SUMMARY OF THE INVENTION

It is an object of the present invention to disclose and provide a force adjusting mechanism for a stylus profiler that overcomes some of the problems in prior art profilers. It is a further object to overcome some of the drawbacks in the spring balance adjustment for stylus arms in profilers in a manner that allows the stylus to contact the surface with a minute, controlled force. Specifically, an object of this invention is to disclose and provide an electromagnetic force coupled to the stylus that subjects the adjusting mechanism of the stylus to a uniform magnetic field in which the force on the stylus is constant as the stylus moves vertically.

The electromagnetic force mechanism of the present invention is used in a stylus profiler which has a carriage for supporting the wafer or other object whose surface is to be measured. A stylus is mounted on a stylus arm, which in turn is mounted on the body of the stylus profiler. A translation mechanism moves the carriage relative to the stylus, and the stylus moves vertically up and down over the surface of the object. Conversely the stylus may be moved laterally across a stationary surface. The stylus arm permits the stylus to move vertically over features or deposits on a surface. The stylus arm is connected to a linear variable differential transformer (LVDT), which includes a core connected to the stylus arm which moves within a transformer. Movement of the core results in a change in the output voltage from the coil.

The stylus force mechanism of the present invention includes a secondary electromagnetic coil and a secondary core, which is in the coil and is operable connected to the stylus to create a magnetic balance. The secondary core is elongated to create a constant force from the secondary coil throughout its length of travel. The length of the secondary core may be greater than the length of the secondary coil so that the secondary core is subject to a uniform field irrespective of its position in the secondary coil. In one embodiment, the LVDT and the secondary core/coil are on opposite ends of the stylus arm about the pivot point. In another embodiment, the LVDT and the secondary coils and both cores are axially aligned, and the secondary core is mounted above and connected to the core in the LVDT.

DETAILED DESCRIPTION OF THE PREFERRED EMBODIMENT

Figure 3:
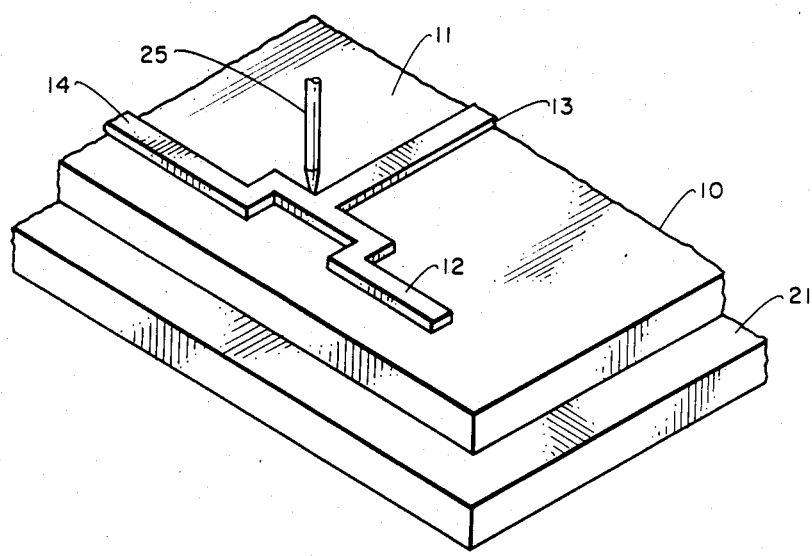
FIG. 3 is a perspective representation of a stylus on a surface

In the stylus profiler in which this invention operates, a stylus moves relative to the surface of a substrate or other object and encounters deposits or other surface irregularities, causing the stylus to move vertically. The vertical movements are recorded. A portion of a typical surface is shown in FIG. 3. Material 10 has a generally flat, upper test surface 11. Protrusion 12 has a side surface 13 and an upper surface 14.

Figure 1:
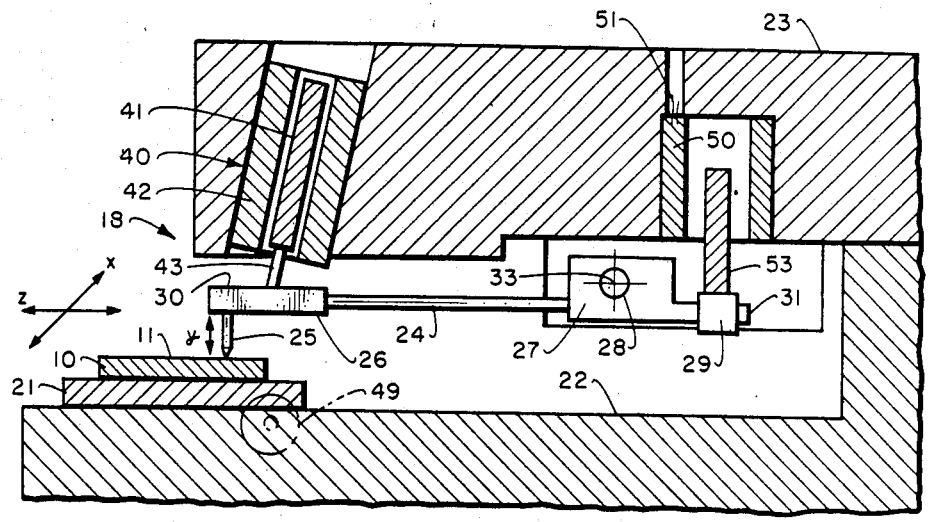
FIG. 1 is a side sectional view of the counter balanced stylus profiler incorporating the electromagnetic force adjustment of the present invention.

Turning first to the FIG. 1 embodiment test object 10 is mounted on carriage 21 which is fixed to base 22 of stylus profiler 18 (FIG. 1). Stylus profiler 18 also has a stylus support member in the form of arm 24 with a stylus 25 of very hard material mounted in carrier 26 at one end 30 of the arm (FIG. 1). Stylus 25 has a normally spherical diamond tip with a small radius generally no greater than about 25 microns but often much smaller.

Arm 24 pivots about a horizontal axis 33 about shaft 28 through support 27. Counterbalance weight 29 on arm 31 of support 27, which is on the right side of axis 33, adjusts to counterbalance the weight of arm 24, carrier 26 and stylus 25 on the left side of axis 33.

As the stylus encounters an irregularity on test object 10, stylus 25 moves approximately vertically. Because motion of stylus 25 actually pivots arm 24, stylus 25 travels in an arc, but the length of the arc relative to the distance from stylus 25 to pivot point 33 is so small that stylus 25 can be considered to move vertically. The device can be calibrated to remove any error from this approximation.

The device measures the vertical movement of the stylus. The core portion 41 of a linear variable differential transformer (LVDT) 40 is attached to the upper part of carrier 26 through a short arm 43. An LVDT is an electromechanical transducer that produces an electrical output proportional to the displacement of movable core 41 within the coils 42 of the LVDT. The manner in which an output voltage is obtained from LVDT 40 is explained in somewhat more detail in Cahill, et al., "Baseline Compensation for Stylus Profiler," Ser. No. 541,274, filed Oct. 12, 1983 and now abandoned. Briefly, transformer coil 40 has a primary coil and two secondary coils symmetrically spaced. Core 41 inside the coils provides a path for the magnetic flux linking the coils. When an AC source energizes the primary coil, voltages are induced in the secondary coils, which are connected in series opposing so that the output voltage from the secondary coils are of opposite polarity. The differences between the voltages in the secondary coils is read by an AC voltmeter. Typically, core 41 has null position. As it moves vertically (y axis of FIG. 1), core 41 increases the induced voltage in one of the secondary coils and decreases the induced voltage in the other secondary coil producing a differential voltage that varies linearly with displacement of core 41.

The stylus profiler has a translation mechanism 49 (shown schematically in FIGS. 1 and 2) that translates carriage 21 along the z axis. Although theoretically, the carriage could also translate along the x axis, the exemplary embodiment of the present invention only provides for z-axis translation. As stylus 25 encounters protrusion 13 (FIG. 3), stylus 25 must move upward which causes arm 24 to pivot about pivot point 33. Stylus carrier 26, which holds stylus 25, is connected to LVDT core 41 by short arm 43. Thus, upward movement of stylus 25 and carrier 26 moves LVDT core 41 upward. By reading the output voltage from the secondary coils of LVDT 42, and recording those for specific positions along the z axis of carriage 21 and test object 10, the device accurately reads the height of protrusion 13 at each position of carriage 21.

Figure 2:
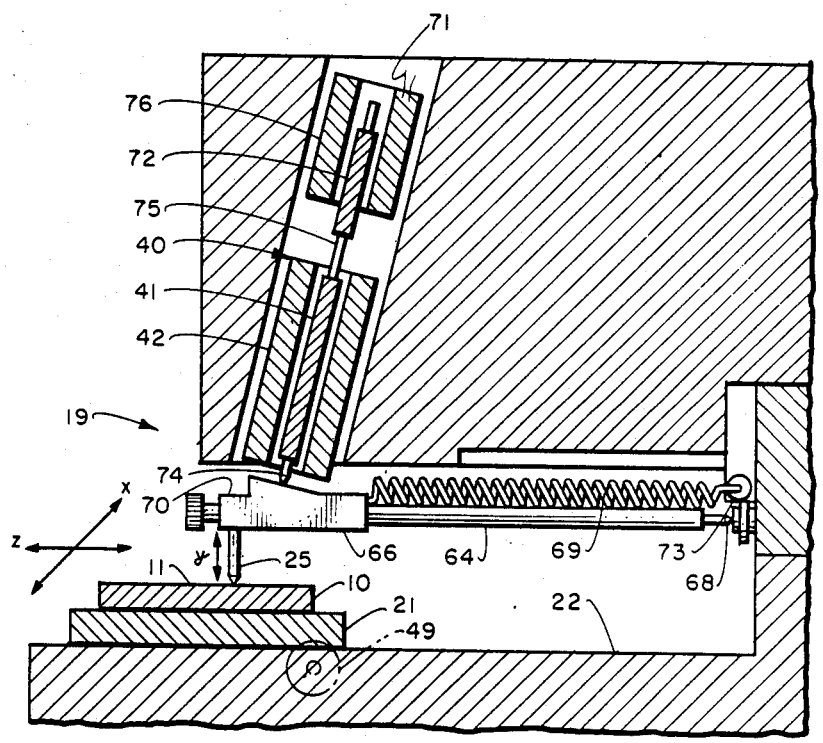
FIG. 2 is a side sectional view of the spring balanced stylus profiler incorporating the electromagnetic force adjustment of the present invention. The view of FIGS. 1 and 2 are not to scale, and many non-essential parts are not shown. Identical parts are numbered the same.

In the FIG. 2 embodiment, stylus profiler 19 also has a stylus support member in the form of arm 64 with a stylus 25 mounted in carrier 66 at one end 70 of the arm. Arm 64 pivots about a horizontal axis at pivot point 68. Spring 69 stretches between carrier 66 of arm 64 to an adjustable connection 73 to counterbalance the weight of arm 64, carrier 66 and stylus 25. The position of connection 73 is adjustable in a known manner to change the vertical and horizontal positions of the end of spring 69 that connects to carrier 66.

As in the FIG. 1 embodiment, which the stylus in FIG. 2 encounters an irregularity on test object 10, stylus 25 moves approximately vertically. This motion is transmitted to the core portion 41 of LVDT 40, which is attached to the upper part of carrier 66 through a short arm 74. Stylus profiler 19 (FIG. 2) has the same translation mechanism 49 that profiler 18 (FIG. 1) has.

Returning to FIG. 1, note that it is not drawn to scale. In the exemplary embodiment, the LVDT coil and core sections have the following approximate dimensions.

TABLE 1

|  | Coil 42 | Core 41 |
| --- | --- | --- |
| Length | 0.8 in (20.32 mm) | 0.64 in (16.26 mm) |
| OD | 0.437 in (11.1 mm) | 0.108 in (2.74 mm) |
| ID | 0.165 in (4.2 mm) |  |
| Mass |  | 3.9 g |

The tip of stylus 25 applies a force to the top surface 11 of wafer 10. The magnitude of the force depends on the combined mass of stylus 25, arm 24, carrier 26, connecting arm 43 and core 41. Because arm 24 and its associated parts pivot, the dimensions and distribution of mass along the arm affect the force that the stylus 25 applies to test object 10.

The distribution of the mass to the right of pivot point 33 including the position of adjustable counterbalance weight 29 counterbalances the force that stylus 25 applies to test object 10. The force should be no greater than about 50 mg depending on the diameter and shape of the tip of stylus 25 as well as the composition of test object 10 and feature 13. The translation velocity between stylus 25 and test object 10 also has an effect. Typically, an adjusting mechanism (not shown) moves counterbalance weight 29 along the z axis to adjust the counterbalance force on the right side of pivot axis 33.

To improve the force adjustment of stylus 25, the present invention includes a force adjusting coil and means for energizing the force adjusting coil to create a magnetic field and a secondary core operably attached to the stylus and positioned within the magnetic field from the force adjusting coil to limit the force of the stylus on the object. Wires 51 direct DC energy to force adjusting coil 50. In the FIG. 1 exemplary embodiment, secondary core 53 extends vertically upward from rear arm 31 of support 27, and secondary coil 50 is mounted in upper portion 23 of housing 22 directly above secondary core 53 such that the core is on the central axis of the coil. The lengths of secondary coil 50 and secondary core 53 and their position relative to each other should be such that the force between coil 50 and core 53 is uniform irrespective of the amount that the arm mechanism pivots about axis 33. Therefore, secondary core 53 is elongated, and a large portion extends below the bottom of secondary coil 50.

Secondary core 53 moves in conjunction with LVDT core 41 in opposite directions because they are on opposite sides of pivot 33. Whereas, the AC current fed to LVDT coil 42 does not yield a counterbalancing force, the DC current in secondary coil 50 exerts a vertical force on secondary core 53. The arrangement in FIG. 1 is such that if the position of adjusting counterweight 29 would yield a force from stylus 25 on test object 10 above the desired force, the polarity of the DC current in core 50 would be adjusted so that the generated magnetic flux would push on core 53. Likewise, if counterbalance weight 29 is adjusted such that there is no force between stylus 25 and test object 10, the DC current in coil 50 can be reversed so that the generated flux pulls on core 53 to supply a controlled force on the right side of axis 33, which is translated to a force between stylus 25 and test object 10.

Although in FIG. 1, core 53 extends upward from arm 31 with coil 50 at least partially above core 53, core 53 could also extend downward from arm 31 in which case coil 50 would be mounted in base 22.

In FIG. 2 spring 69 balances the vertical force of stylus 25 on test object 10. The vertical component of the force from spring 69 acts against the gravity forces, which determines the actual force that stylus 25 makes on surface 11 of material 10. As in FIG. 1, the force should be no greater than 50 mg. Typically, the adjustments are done by an adjus mechanism (not shown) that moves the vertical and horizontal position of connection 73 at the right end (FIG. 2) of spring 69.

In the FIG. 2 exemplary embodiment, force adjusting coil 72 is mounted above and axially aligned with transformer coils 42 of LVDT 40. Wires 71 direct DC energy to force adjusting coil 76. Secondary core 72 is also mounted in line with core 41 of LVDT. A narrow diameter rod 75 positions secondary core 72 relative to core 41 of LVDT and causes cores 72 and 41 to move together.

The dimensions of the force adjusting coil and secondary core are different from their counterparts in the LVDT. The following are possible dimensions for either embodiment:

TABLE 2

|  | Coil 50, 76 | Core 53, 72 |
|---|---|---|
| Length | 0.450 in (11.4 mm) | 0.56 in (14.2 mm) |
| OD | 0.375 in (9.5 mm) | 0.062 in (1.57 mm) |
| ID | 0.15 in (3.8 mm) |  |
| Mass |  | 0.2 g |

FIG. 1 is not drawn to scale, but Table 2 shows that the length of core 53 is greater than the length of the coil 50. The dimensions can be changed, but the magnetic field created by force adjusting coil 50 or 76 should be uniform on core 53 or 72 over a wide range of positions of either core. Workers in the field may utilize other methods of coupling the force adjusting coil-core with the stylus such that the core of the LVDT 40 moves in conjunction with movement of the force adjusting core 53 or 72.

Various modifications and changes may be made in the configurations described above that come within the spirit of this invention. The invention embraces all such changes and modifications coming within the scope of the appended claims.

We claim:

1. In an instrument for determining the surface profile of an object having a nominal surface with irregularities on the surface, the instrument having carriage means for supporting the object, a stylus, stylus supporting means for supporting the stylus on the object, translation means for moving the carriage and the stylus relative to each other such that the stylus moves along the surface of the object, the stylus supporting means permitting movement of the stylus toward and away from the surface of the object when the stylus encounters an irregularity on the surface, and reading means operably connected to the stylus for generating an output signal dependant on the position of the core in the coil, the improvement in supporting means comprising the provision of:

force adjusting coil means comprising a force adjusting coil and means for energizing the force adjusting coil to create a magnetic field, a secondary core operably attached to the stylus, mounted at least partially within the force adjusting coil and positioned within the magnetic field from the force adjusting coil to limit force of the stylus on the object.

2. In an instrument for determining the surface profile of an object having a nominal surface with irregularities on the surface, the instrument having carriage means for supporting the object, a stylus, stylus supporting means for supporting the stylus on the object, translation means for moving the carriage and the stylus relative to each other such that the stylus moves along the surface of the object, the stylus supporting means permitting movement of the stylus toward and away from the surface of the object when the stylus encounters an irregularity on the surface, and reading means operably connected to the stylus for generating an output signal dependant on the position of the core in the coil, the improvement in supporting means comprising the provision of:

force adjusting coil means comprising a force adjusting coil and means for energizing the force adjusting coil to create a magnetic field, a secondary core operably attached to the stylus and positioned within the magnetic field from the force adjusting coil to limit force of the stylus on the object.

3. The improved stylus support means of claim 2 wherein the supporting means is mounted for pivoting about an axis when the stylus encounters such irregularities, the secondary core being mounted on the support means on the opposite side of the pivot from the stylus.

4. The improved stylus supporting means of claim 3 wherein the secondary core extends upward from the support means, the secondary core extending partially out of the force adjusting coil means.

5. The improved stylus supporting means of claim 4 wherein the support means further includes a counterbalance weight on the side of the pivoting axis opposite the stylus to act as a counterbalance for the stylus supporting means.

6. The improved stylus supporting means of claim 2 wherein the axis of the force adjusting coil is on the same axis as the axis of the coil of the linear variable differential transformer.

7. The improved stylus supporting means of claim 2 wherein the secondary core and the core of the linear variable differential transformer are mounted on the same axis, and the core of the linear variable differential transformer is positioned between the secondary core and the stylus.

8. An instrument for determining the surface profile of an object having a nominal surface with irregularities on the surface, carriage means for supporting the object, a stylus, stylus supporting means for supporting the stylus on the object, translation means for moving the carriage and the stylus relative to each other such that the stylus moves along the surface of the object, the stylus supporting means permitting movement of the stylus toward and away from the surface of the object when the stylus encounters an irregularity on the surface, a first core operably attached to the stylus support means for moving generally vertically as the stylus moves vertically upon encountering surface irregularities, a first coil around the first core and AC means for energizing the first coil with AC current whereby the first core generates an output signal dependent on the position of the first core in the first coil, and a second core on the stylus support means, a second coil mounted about at least a portion of the second core, and DC means for supplying DC current to the second coil to apply a force on the second core whereby such force on the second core counterbalances the mass of the stylus and the first core.

* * * * *